Patented Apr. 30, 1946

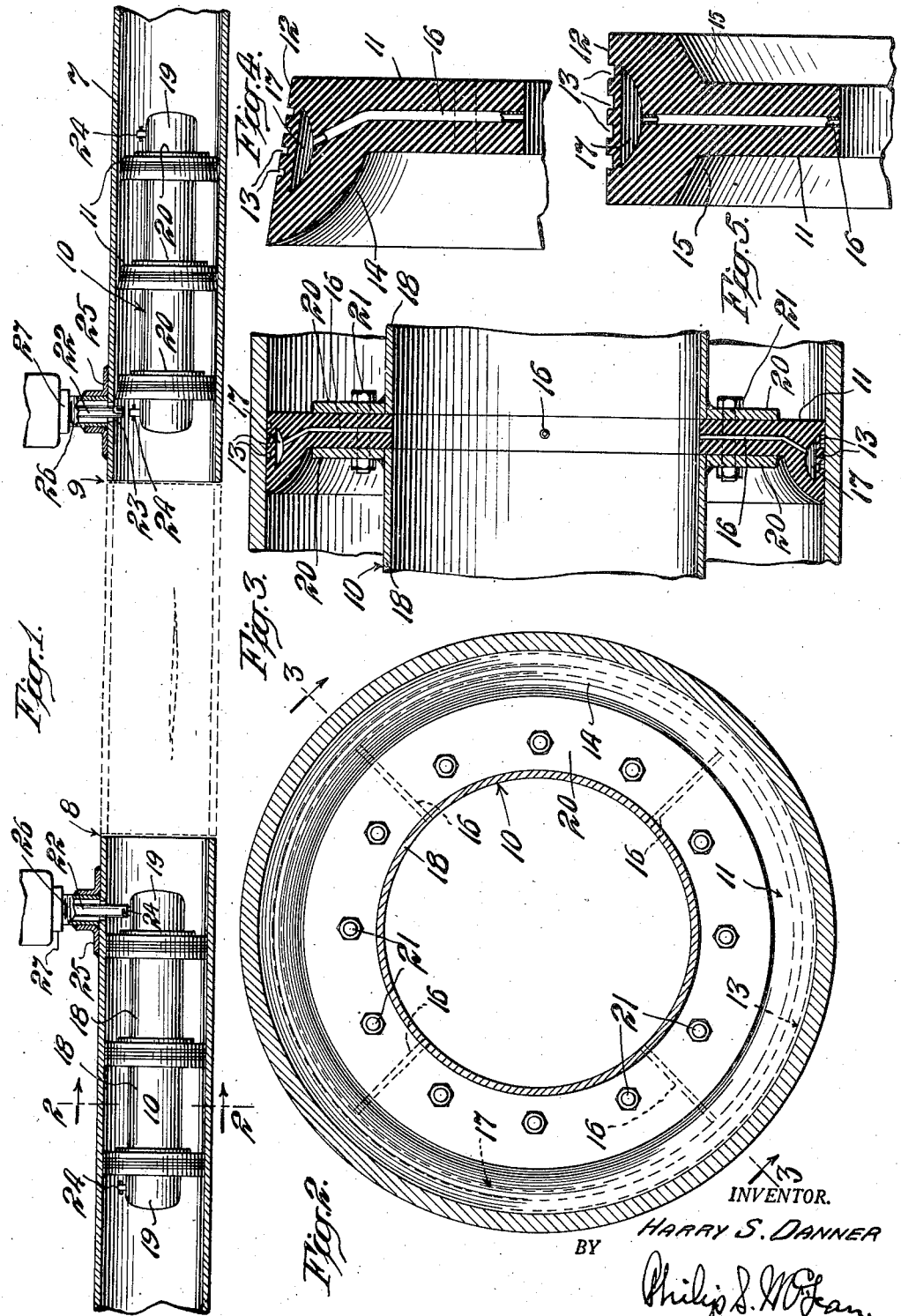

2,399,544

UNITED STATES PATENT OFFICE 2,399,544

PIPE-LINE REPAIR PLUG

Harry S. Danner, Tamaqua, Pa.

Application June 3, 1944, Serial No. 538,687

12 Claims. (Cl. 138—93)

The invention herein disclosed relates to the repair of pipelines, particularly those carrying petroleum and petroleum products.

Heretofore when breaks or leaks have occurred and it has been necessary to cut out and replace a section, it has been customary to plug the pipe at opposite sides of the break with clay, after the broken section has been removed by using mechanical cutters. These clay plugs prevent seepage of liquid and accumulation of gas and hence make it safe for welding in the new section, but this method naturally has objections, particularly in that special knowledge, care and skill are required to prepare, set and maintain such plugs and, when they are subsequently forced through the line, after repairs are completed, the clay will contaminate the oil for a time.

The present invention has for its purpose to avoid and eliminate objections such as mentioned and particularly aims to provide a satisfactory and practical method of plugging a pipeline at opposite sides of a leak, which can be installed quickly and easily, right at the point where it is required and without requiring special knowledge and skill, as in the use of clays, and the like.

Further special objects are to provide a repair plug in a form which can be readily made up to meet usual or special circumstances, which can be readily introduced into the pipe without having to force it in place and then, at the proper time be sealed in its position in the pipe and after having served its purpose, be released from the sealed, holding engagement and passed through the pipe and taken out at the nearest scraper trap or other discharge point.

Other objects of the invention are to provide a repair plug of the nature outlined, which will pass through a pipeline without danger of catching in gate valves or the like, and which if it should hang up in a gate valve or the like, as because of the presence of foreign matter in the line, may be disassembled to an extent sufficient to enable its withdrawal through the bonnet of the gate valve.

Other desirable objects and the novel features by which all purposes of the invention are attained, will appear or are specifically set forth in the course of the following specification.

The drawing accompanying and forming part of the specification illustrates certain present embodiments of the invention, but the structure and method of use may be further modified and changed all within the true intent and broad scope of the invention as hereinafter defined and claimed.

Fig. 1 in the drawing is a broken part sectional view of a pipeline showing two of the repair plugs introduced therein at opposite sides of a cutout section of the line.

Fig. 2 is an enlarged vertical cross-sectional view as on line 2—2 of Fig. 1.

Fig. 3 is a broken longitudinal sectional view as on line 3—3 of Fig. 2.

Figs. 4 and 5 are broken sectional details of different forms of inflatable diaphragms.

In Fig. 1, a portion of pipeline is represented at 7, which may be considered as having been cut at 8 and 9, for removal of a broken or leaking section. After draining back to the nearest valves or high points in the line, these two ends can be closed and sealed by the plugs of the present invention. Generally, each plug consists of an elongated hollow support 10, small enough to pass freely through the line and carrying a series of outstanding annular flanges or diaphragms 11, which while of a size and shape to easily enter the pipe, can be inflated from compressed air within the hollow support, to firmly fit and seal against the wall of the pipe.

In present forms of the invention, the packing flanges 11, are made up of water and oilproof, acid-resistant synthetic rubber, such as "neoprene," "Hy Car" or "Ameripole" in substantially flat annular form with a widened rim 12, which may carry one or more sealing ring grooves 13.

As shown in Fig. 4, the rim portion of the sealing flange or disc may be somewhat conical in form to facilitate entry into the pipe and to provide a cupped formation at one side at 14, for holding the oil while being forced through the line to a point of discharge.

Instead of being cupped at only one side, the sealing discs may be cupped at both sides as indicated at 15, in Fig. 5, this form having the advantage of being displaceable by oil flow in either direction.

The external diameter of the packing flanges is enough less than the internal diameter of the pipe in which they are to be used to admit of their easy entry into such pipe as indicated at the right in Fig. 1 and they are expanded into full sealing engagement with the pipe wall by air or other fluid pressure supplied from the hollow supporting structure 10.

In the illustration, the annular discs 11, are shown as having radial air passages 16, open at the inner ends to the interior of the hollow support and open at the outer ends to annular air chambers 17, in the rim portions of the discs.

The hollow support 10 is shown as made up in sections, in the ilustration, two intermediate spool sections 18, 18, and two end caps 19, 19, all these sections having complementary opposed end flanges 20, receiving between them the inner portions of the annular discs. Screw bolts 21, passed through the flanges and intervening portions of the discs serve to secure these parts in firmly assembled relation and the clamped portions of the discs serve as leak-proof gaskets between the connected sections.

While usual at this time to provide three packing flanges to a plug, particularly so that in passing through a gate valve or the like, two of such flanges will provide support on the pipe, while the other flange is passing over the depression formed by the valve seat, it is contemplated that more or less than these three flanges may be employed, the built-up sectional construction of the plug providing for such changes.

This sectional form of construction also is of special advantage, if for any reason the plug should get caught in a gate valve housing, for then after removal of the bonnet of the valve housing, the plug may be disassembled by removal of bolts 21, and be taken out in pieces, thus avoiding need for cutting the pipe.

A present preferred method of inflating the discs into sealing engagement with the pipe is as shown in Fig. 1, to introduce a compressed air chuck 22, through a hole 23, provided in the pipe, into clutched engagement with a complemental air inlet fitting 24, on the hollow support 10. These air couplings 24 may be provided at one or both ends, or on the intermediate sections of the hollow support, so that air may be supplied at the point which can be most conveniently reached.

The present practice, after making the cuts at 8 and 9, Fig. 1, is to weld on saddles 25, back of the cuts, these carrying screw nipples 26, for gate valves 27, through which tapping machines for cutting the holes 23, may be introduced. The air supply line fitting 22, may have a quick detachable coupling engagement with the fitting 24, of the hollow support, such as indicated, so that the sealing flanges may be quickly inflated in the first instance, and then after a new section of pipe has been welded on, be quickly deflated. After operations are completed at a repair point, the gate valves, if used, may be removed from the fittings 25, 26, and the latter be permanently capped.

If the sealing flanges are designed for one way travel in the pipe, as first illustrated, then care is exercised to see that both plugs are headed in the same direction, so as to travel with the oil, as pumped in from a station at the left in Fig. 1.

In entering the one plug in the opposite direction to which it is faced, in the example, the one at the left in Fig. 1, it may be necessary or helpful to collapse the outstanding flanges somewhat and this may be done by means of cones such as ordinarily used at scraper traps.

The center support 10 in addition to serving as a mechanical connector and spacer for the flexible flanges 11, also serves as a means to float the plug along on the oil, practically without wear on the pipe or on the flanges. This hollow center may take up most of the cross-section of the pipe, enabling use of relatively narrow outstanding piston flanges. To prevent collapse of the radial air passages 16, through the flanges, these may be provided by flexible metal tubing embedded in the rubber when the flanges are first molded or otherwise formed. The hollow center support is enough smaller than the pipe to enable it being of any desirable length for best steadying the plug and holding it lined up in the oil flow. The float portions being made up in easily assembled sections can be shipped knocked down to the point of use and then quickly set up in lengths best suited to the particular requirements. The hollow center support provides a ready means for quickly inflating or deflating the piston flanges and the inflation of these elements holds the device securely in position, so that there is no need to provide any abutment or anchorage for holding the plugs at the selected positions. Of particular importance, there is no necessity to displace all the fluid out of the line before the plug can be used.

What is claimed is:

1. A pipeline repair plug, comprising an elongated hollow, center support for passage through a pipeline and having spaced flexible outstanding annular flanges for cooperation with the wall of the pipeline, said plug being free for unrestrained travel through a pipeline and the elongated hollow support being closed and buoyant in the fluid passing through the pipeline so as to be floated in and transported by flow of fluid through the pipeline and said spaced annular flanges being disposed near opposite ends of the elongated floating support to thereby guide the latter in such floating travel through the pipeline.

2. A pipeline repair plug, comprising an elongated hollow center support for passage through a pipeline and having spaced flexible outstanding annular flanges for cooperation with the wall of the pipeline, said flexible flanges being inflatable and having passages in communication with said hollow center support.

3. A pipeline repair plug, comprising an elongated hollow center support for passage through a pipeline and having spaced flexible outstanding annular flanges for cooperation with the wall of the pipeline, said flexible flanges being inflatable and having passages in communication with said hollow center support and quick attachable and detachable air coupling means connectible with said hollow center support.

4. A pipeline repair plug, comprising an elongated tubular float of a size for free passage through a pipeline, pneumatically expansible flexible pipe engaging flanges carried by said tubular float and having inflating and deflating passages extending therefrom into the interior of said tubular float and means on said tubular float for effecting admission of inflating fluid to or release of the same from said tubular float.

5. A pipeline repair plug, comprising an elongated tubular float of a size for free passage through a pipeline, pneumatically expansible flexible pipe engaging flanges carried by said tubular float, inflating and deflating passages extending from the interior of said tubular float to the interior of said pneumatically expansible flanges and means engageable with said tubular float for effecting pneumatic expansion and contraction of said pipe sealing flanges.

6. A pipeline repair plug, comprising an elongated tubular float of a size for free passage through a pipeline, pneumatically expansible flexible pipe engaging sealing flanges carried by said tubular float, said tubular float comprising tubular sections with opposed end flanges, the flexible sealing flanges having portions engaged between said end flanges and means detachably connecting said end flanges.

7. A pipeline repair plug, comprising a tubular float made up of end caps and intermediate spool sections and flexible annular pipe sealing flanges clamped between opposing ends of said cap and spool sections.

8. A pipeline repair plug, comprising a tubular float made up of end caps and intermediate spool sections, flexible annular pipe sealing flanges clamped between opposing ends of said cap and spool sections, said flexible pipe sealing sections having pneumatic expansion chambers therein and passages extending radially inwardly from said expansion chambers and means for supplying compressed air to the interior of said tubular sections for expanding the flexible flanges or for releasing air pressure to permit collapse of said flexible flanges.

9. A pipe line repair plug, comprising an elongated tubular support free for unrestrained travel through a pipeline and closed and buoyant to float in and be thereby transported by fluid flowing in the pipeline, an inflatable and deflatable piston flange projecting circumferentially from said tubular support and having an inflating and deflating connection extending therefrom into the tubular support and means for supplying inflating fluid to or releasing it from said tubular support.

10. A pipe line repair plug, comprising an elongated tubular support made up of end-to-end related tubular sections, inflatable piston elements engaged between adjoining ends of said sections and having internal passages opening to the interior of said tubular support, means for securing the support sections together with said piston elements engaged therebetween and means for effecting supply of inflating fluid to and release of the same from the interior of said tubular support.

11. A pipeline repair plug comprising an elongated tubular float of a size for free passage through a pipeline, an annularly outstanding, pneumatically expansible, pipe sealing flange carried by said tubular float and having an inflating and deflating passage extending therefrom into the interior of said tubular float, said sealing flange having a peripheral pipe engaging piston area extended longitudinally in the direction of elongation of the float, and said float having means for enabling admission and release of inflating fluid.

12. A pipeline repair plug comprising an elongated tubular float of a size for free passage through a pipeline, an annularly outstanding, pneumatically expansible, pipe sealing flange carried by said tubular float and having an inflating and deflating passage extending therefrom into the interior of said tubular float, said sealing flange having a peripheral pipe engaging piston area extended longitudinally in the direction of elongation of the float, and said float having means for enabling admision and release of inflating fluid, said float having opposed flanged sections, the sealing flange having its inner radial portion engaged between the flanges of said float sections and means securing the flanges together in clamping engagement with said pipe engaging sealing flange.

HARRY S. DANNER.